(12) United States Patent
Takahashi et al.

(10) Patent No.: US 12,077,282 B2
(45) Date of Patent: Sep. 3, 2024

(54) AUTONOMOUS GUIDANCE AND FLIGHT CONTROL SYSTEM IMPLEMENTATION ON A PARTIAL-AUTHORITY AIRCRAFT

(71) Applicant: USA as represented by the Secretary of the Army, Washington, DC (US)

(72) Inventors: Marc D. Takahashi, Cupertino, CA (US); Brian T. Fujizawa, Santa Rosa, CA (US); Jeffery A. Lusardi, Woodland, WA (US)

(73) Assignee: United States Government as represented by the Secretary of the Army, Washington, DC (US)

( * ) Notice: Subject to any disclaimer, the term of this patent is extended or adjusted under 35 U.S.C. 154(b) by 323 days.

(21) Appl. No.: 17/719,967

(22) Filed: Apr. 13, 2022

(65) Prior Publication Data

US 2022/0380023 A1    Dec. 1, 2022

Related U.S. Application Data

(60) Provisional application No. 63/193,648, filed on May 27, 2021.

(51) Int. Cl.
*B64C 13/50* (2006.01)
*B64D 43/00* (2006.01)
*G08G 5/00* (2006.01)

(52) U.S. Cl.
CPC ............ *B64C 13/503* (2013.01); *B64D 43/00* (2013.01); *G08G 5/003* (2013.01)

(58) Field of Classification Search
CPC ....... B64C 13/503; B64D 43/00; G08G 5/003
USPC ............................................................. 701/3
See application file for complete search history.

(56) References Cited

U.S. PATENT DOCUMENTS

| | | | | |
|---|---|---|---|---|
| 7,751,976 | B2 * | 7/2010 | Matuska .............. | G05D 1/0858 701/9 |
| 8,019,492 | B2 * | 9/2011 | Halaas ................. | G05D 1/0061 244/76 R |
| 8,052,096 | B2 * | 11/2011 | Cerchie ................ | B64C 13/505 244/17.11 |
| 8,948,936 | B2 * | 2/2015 | Shue .................... | G05D 1/0858 701/4 |
| 11,059,568 | B2 * | 7/2021 | Chu ....................... | B64C 13/10 |

* cited by examiner

*Primary Examiner* — Andrew Joseph Rudy
(74) *Attorney, Agent, or Firm* — Karen G. Hazzah

(57) ABSTRACT

This disclosure provides a means to implement an autonomous guidance and flight control system on a partial authority aircraft. One embodiment of the disclosure includes receiving a control command result, filtering the control command result into a low frequency component and a high frequency component, directing the low frequency component to at least one trim servomechanism and directing the high frequency component to at least one stability augmentation stabilizer servomechanism, linking outputs from the trim servomechanism and the stability augmentation stabilizer servomechanism for actuating a pilot control configured to control rotors, and actuating at least one rotor. The low frequency component includes frequencies below a break frequency and the high frequency component includes frequencies above the break frequency. The break frequency is established by rate and position of the at least one servomechanism.

19 Claims, 10 Drawing Sheets

AUTONOMOUS GUIDANCE AND FLIGHT CONTROL SYSTEM IMPLEMENTATION ON A PARTIAL-AUTHORITY AIRCRAFT

FIELD OF USE

The present disclosure generally relates to a flight control system, and more specifically, a method to implement an autonomous guidance and flight control system on a partial authority aircraft.

BACKGROUND

Autonomous guidance and flight control systems are becoming an increasingly important part of aircraft systems that offload the pilot from manually flying the aircraft, so they can direct their attention to other activities. Typically, these autonomous systems are implemented on full-authority Fly-By-Wire (FBW) aircraft where the primary actuators for the control surfaces on the aircraft can be directed to move their full range and at their full rate by a computer that senses the pilot's inceptor motions and converts them into electrical signals sent to the primary actuators. Partial-authority systems, on the other hand, have linkages between the pilot's inceptors that are mechanically connected to the primary actuators, which directly command the inceptor motion. The mechanical linkages have slow moving trim servomechanisms attached to them that can move the pilot controls their full position authority and thus, the primary actuators. On helicopters (also referred to as rotorcraft), these trim servomechanisms are used in the slower elements of the basic flight controls to help the pilot regulate trim of the aircraft. Fast moving actuators are also connected to the primary actuator to allow a Stability Augmentation System (SAS) to damp the aircraft motions to help the pilot attitude stabilize the aircraft. These fast actuators are only given a fraction of the full range of primary actuator motion, so their ability to upset the aircraft in the event of a failure is limited.

Rotorcraft operations in adverse conditions, such as degraded visual environments (DVE), are a necessary capability to increase survivability and operational effectiveness of the future U.S. military rotorcraft fleet. This capability will allow operations of U.S. forces in all-weather and in darkness against increasingly sophisticated adversaries. To meet this challenge, pilots need enhanced situational awareness and increased piloting capabilities to fly through obstacle-rich terrain in a variety of DVEs. A critical element to achieve this capability is autonomous guidance and flight control systems that offload the pilot's workload of manually flying the aircraft, so they can direct their attention to managing the mission instead. Situational awareness is essential, so the pilot can quickly assess if the autonomous capability is operating properly and can take over the flying task from the autonomous capability if it is not. Attaining this level of autonomous capability can be achieved by several means including development of new full-authority Fly-By-Wire (FBW) rotorcraft, retro-fitting existing partial-authority fleet helicopters with this FBW technology, or adapting the current partial-authority architecture of fleet helicopters. The term "full-authority" refers to a flight control system where the primary actuators for the control surfaces on the aircraft can be directed to move their full range and at their full rate by a computer that senses the pilot's inceptor motions and converts them into electrical signals sent to the primary actuators. Failures in the Flight Control Systems (FCS) are mitigated by redundant systems and design methods, such as voting, to avoid sending bad signals to the primary actuators. Alternately, a "partial-authority" system has linkages between the pilot's inceptors that are mechanically connected to the primary actuators; these systems make up virtually all of the current U.S. military fleet helicopters. These actuators are then directly commanded by the inceptor motion. The mechanical linkages have slow moving trim servomechanisms attached to them that effectively move both the pilot controls and thus, the primary actuators. On current fleet helicopters, these trim servomechanisms are used in the slower elements of the basic FCS to help the pilot regulate trim of the aircraft. The pilot can always override the back drive of these trim servomechanisms by pushing against them or by activating a trim release switch to stop them. Fast moving actuators are also connected to the primary actuator to allow a Stability Augmentation System (SAS) to damp the aircraft motions to help the pilot attitude stabilize the aircraft. These fast actuators are only given a fraction of the full range of primary actuator motion, so their ability to upset the aircraft in the event of a failure is limited. Therefore, mitigation of failures in a partial-authority FCS is achieved because the pilot inceptors are mechanically connected to the primary actuators, and the pilot always has direct control of them by overriding the force of the trim servomechanisms and the position authority of the SAS actuators. To be clear, SAS actuators are a type of servomechanism, but they will be referred to herein as SAS actuators.

Safe navigation through DVEs using an autonomous guidance and control system on rotorcraft can be achieved either through a full-authority or partial-authority system and will allow for hands-off piloting allowing increased piloting capabilities. A cost benefit analysis of implementing current autonomous guidance and control laws onto existing partial authority rotorcraft would need to weigh the cost of replacing all the partial-authority hardware with full-authority FBW hardware against modifying the existing hardware. Additionally, the cost of production of an entirely new full-authority fleet helicopter would need to be considered against the two previously mentioned options. Therefore, there is a need for a partial authority rotorcraft option that has an autonomous guidance and flight control system that operates as effectively as that of a full authority system as a potential alternative in the fleet modernization strategy.

BRIEF SUMMARY

This disclosure describes a method to allocate control commands from an autonomous guidance and flight control system through a partial authority mixing unit that divides the control commands into a low frequency component sent to trim servomechanisms and a high frequency component sent to SAS actuators. Because the partial authority mixing unit is inserted between autonomous guidance and flight control laws and the trim servomechanisms, it doesn't require large changes to the autonomous guidance and flight control laws. Therefore, the present disclosure gives a straight-forward path to implement an autonomous guidance and flight control system onto a partial-authority aircraft that was originally designed for a full-authority aircraft.

This disclosure describes an embodiment of a system to implement an autonomous guidance and flight control system on a partial authority aircraft. The embodiment consists of added hardware devices to switch exclusive control of the trim servomechanisms and SAS actuators on the partial authority aircraft to the autonomous guidance and flight control laws. A partial-authority mixing assembly is inserted after the autonomous guidance and flight control laws, which allocates the control inputs to the trim and SAS actuators. To enhance the inherent trim servomechanisms in the system, special servo-loop control is applied, so the partial-authority mixing can more effectively control the partial-authority aircraft. In this embodiment, the autonomous guidance and flight control laws were previously developed on a full-authority aircraft and have been converted for use on the partial-authority aircraft embodiment of this disclosure, demonstrating the effectiveness of the implementation.

More information regarding the development of the autonomous guidance and flight control laws can be found in the following publicly available paper, which was published in June 2020 and is hereby incorporated by reference: Takahashi, Marc & Fujizawa, Brian & Lusardi, Jeffery & Whalley, Matthew & Goerzen, Chad & Schulein, Gregory & Mielcarek, Nathan & Archdeacon, John & Cleary, Mark & Carr, James & Waldman, David. (2020). *Autonomous Guidance and Flight Control on a Partial-Authority Black Hawk Helicopter.* 10.2514/6.2020-3286.

BRIEF DESCRIPTION OF DRAWINGS

For a better understanding of the nature and objects of the disclosure, reference should be made to the following detailed description taken in conjunction with the accompanying drawings, which are described as the.

Reference is made in the following detailed description of preferred embodiments to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

Figure 1:
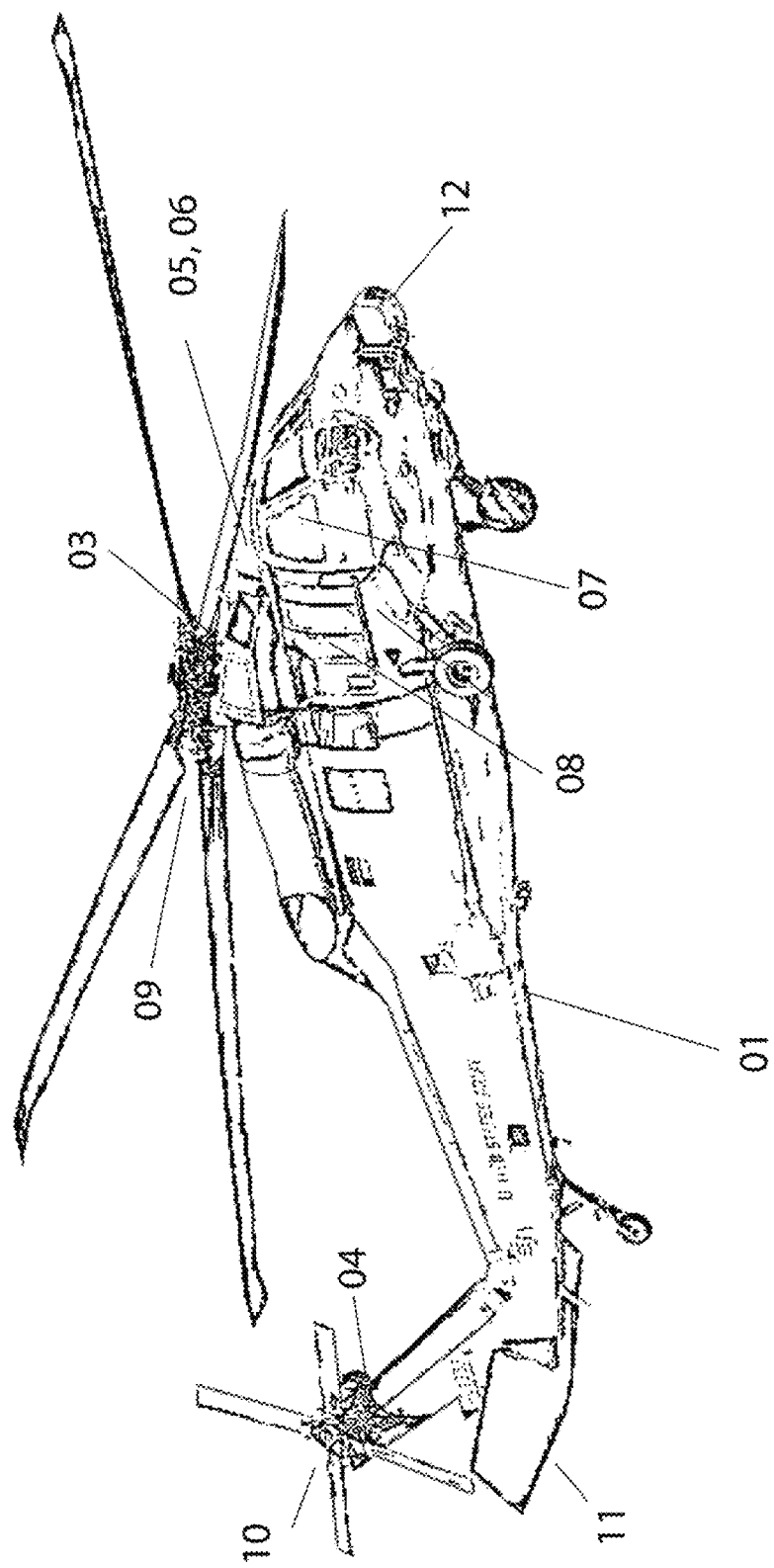
FIG. 1 is an example of a UH-60L partial authority helicopter on which an embodiment of an autonomous guidance and flight control system is implemented.

The present disclosure provides an autonomous flight control and guidance system implementation on a partial authority aircraft 01, which is generally illustrated in FIG. 1. The autonomous flight control and guidance system implementation on a partial authority aircraft 01 includes main rotor primary actuators 03, tail rotor primary actuators 04, trim servomechanisms 05, SAS actuators 06, a tail rotor 10, a horizontal stabilizer 11, and a Multi-Function Laser Detection And Ranging (LADAR) (MFL) range sensor 12.

Figure 2:
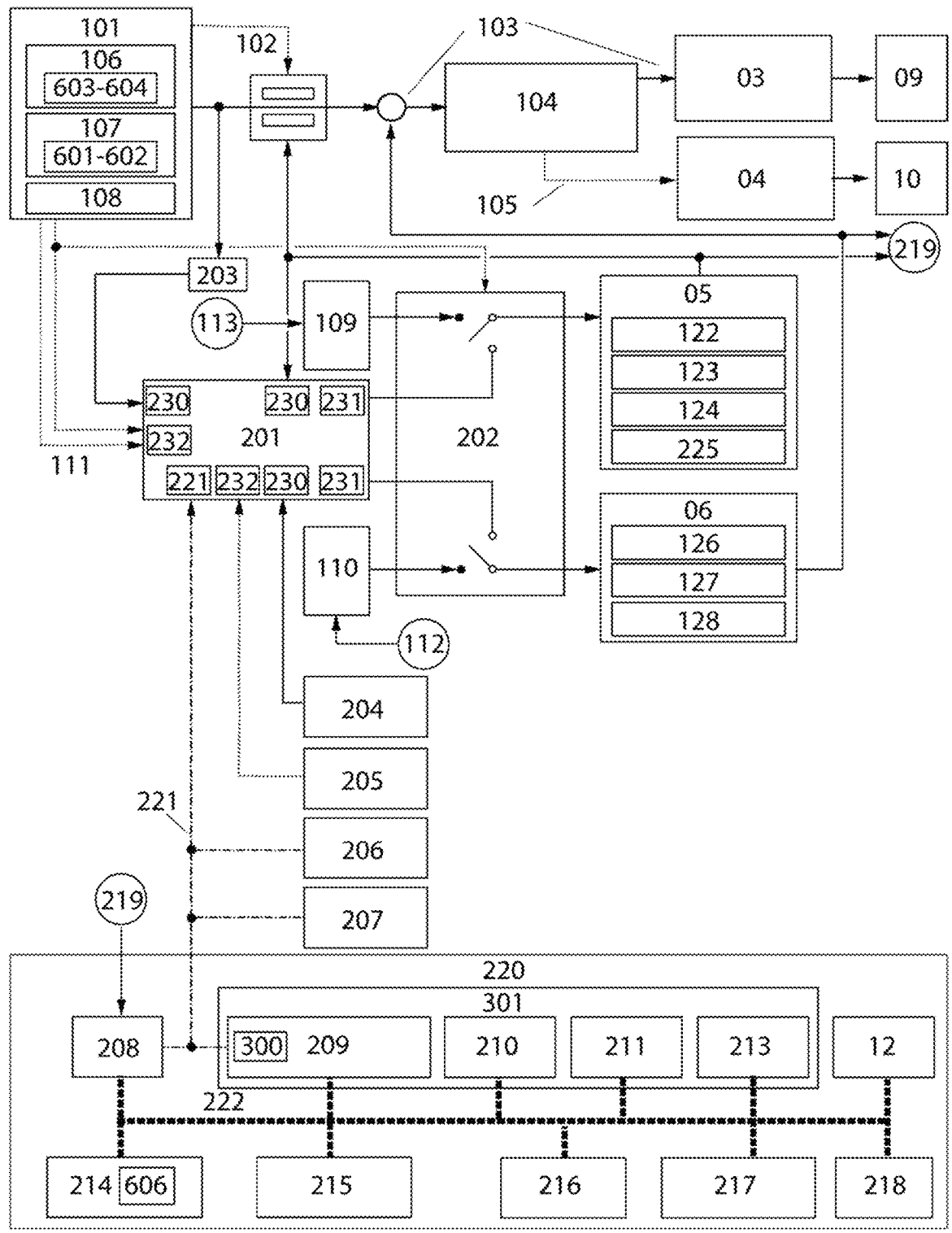
FIG. 2 is a schematic of the embodiment of the autonomous guidance and flight control system for the partial authority helicopter shown in FIG. 1.

As shown in FIGS. 1 and 2, the autonomous guidance and flight control system implementation on the partial authority aircraft 01 includes an aircraft assembly consisting of standard equipment on a UH-60L helicopter (represented with numbers less than 200 on FIG. 2). The aircraft assembly is collectively configured to operate control surfaces of the partial authority aircraft 01. The aircraft assembly includes pilot(s) controls 101, mechanical linkages 103 and linkages and/or cables 105 connected to a mechanical mixing unit (MMU) 104, which in turn controls the main rotor primary actuators 03 and tail rotor primary actuators 04. The MMU 104 is located above cabin 08 area of the aircraft. The control surfaces are the rotor blades on the main rotor 09 and tail rotor 10 that are changed by the primary actuators 03, 04 to guide aircraft motion along lateral, longitudinal, heading, and vertical directions. The main rotor primary actuators 03 are located below the main rotor 09 and above the cabin area 08, while the tail rotor primary actuator 04 is near the tail rotor 10. The position of the horizontal stabilizer 11 on the partial authority aircraft 01 is set by production model scheduling and is not controlled in this embodiment. There is a plurality of SAS actuators 06 and trim servomechanisms 05 for each axis of control. The trim servomechanisms 05 and SAS actuators 06 are located above the cabin 08 area and cockpit 07. The SAS actuators 06 are comprised of a longitudinal 126, lateral 127, and pedal 128 SAS actuator. The trim servomechanisms 05 are comprised of a longitudinal 122, lateral 123, and pedal 124 servomechanism. In this embodiment, an additional collective servomechanism 225 is added but no corresponding collective SAS actuator is added. In an alternative embodiment, collective a SAS actuator may be included to allow better control in this axis. These servomechanisms exist on the aircraft for a Stability Augmentation System (SAS) 110 and a Flight Path Stabilization System (FPS) 109. Using production aircraft state measurements 112, the SAS 110 provides rate damping feedback to the aircraft using the SAS actuators 06. Using production aircraft heading, yaw rate and airspeed measurements 113, the FPS 109 produces speed and pitch control stabilization, as well as turn coordination and heading hold, using feedback to the trim servomechanisms 05. Both 110 and 109 comprise the standard flight controls of the partial authority aircraft 01.

Figure 7:
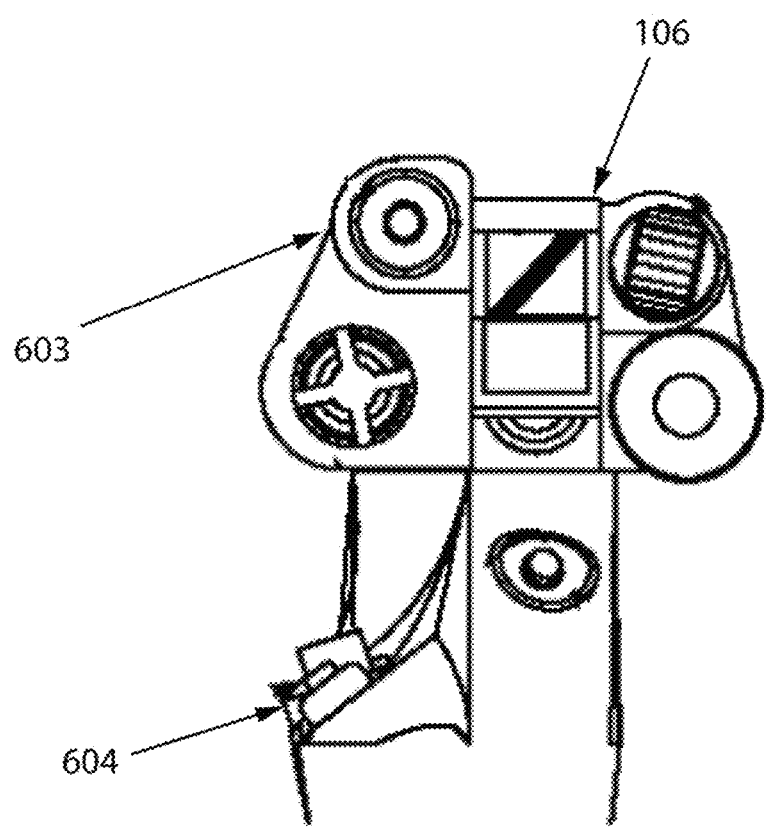
FIG. 7 is an illustration of a cyclic grip of the present disclosure that enables pilot interaction with autonomous capability that avoids moving pilot controls against the autonomous capability commands to the trim servomechanisms.

Additional hardware is added to implement autonomous capability on the partial-authority aircraft 01 (identified with numbers greater than 199 in FIG. 2). A hardware flight control computer (HFCC) 201 and a SAS/Trim interface Box (STIB) 202 are added, which could be configured to allow the plurality of SAS actuators 06 and the trim servomechanisms 05 to be controlled through the HFCC 201. In this embodiment, the STIB 202 is engaged (switches in the vertical position) through a magnetic switch 605 at a pilot station, which allows commands from the HFCC 201 to control the trim servomechanisms 05 and the SAS actuators 06. The HFCC 201 also acts as the nexus for the data coming from various measurement systems using Analog to Digital (A/D) 230, Digital to Analog (D/A) 231, Digital I/O (DIO) 232, and MIL-STD-1553B bus 221. The pilot(s) can also disengage the system from a disengage button 604 on the cyclic grip 106, as shown in FIG. 7, ultimately releasing the magnetic switch 605, which would change the STIB 202 configuration (switches in the horizontal position) so that the partial authority aircraft 01 will revert to where the pilot could manually fly the standard UH-60L flight controls with the SAS 110 and FPS 109 actively engaged. It is important to understand that the system proposed in this disclosure requires that, when engaged, the autonomous capability has exclusive control of the trim servomechanisms 05 and SAS actuators 06. The pilot cannot push against the inceptor forces generated by the trim servomechanisms 05 and thus introduce interfering inputs to the main rotor primary actuators 03 and tail rotor primary actuators 04 through the mechanical linkages 103 and 105. The pilot also cannot use the trim release signal 102, which would stop the trim servomechanisms 05 and thus interfere with the control commands emanating from the Mission Adaptive Autonomy (MAA) assembly 220.

The autonomous behavior of the system results from the remaining hardware shown in the bottom of FIG. 2. The MAA assembly 220 is comprised of a plurality of computers 209-213 that run the autonomous guidance and flight control laws 301, with one computer, MAA-A 209, relaying the apportioned trim servomechanism 05 and SAS actuator 06 commands to the HFCC 201 though a MIL-STD-1553B bus 221. The autonomous guidance and flight control laws 301 generate total stick commands, which are apportioned and relayed by the Partial Authority (PA) mixing unit 300 on the MAA-A computer 209. Feedback to the MAA assembly 220 is provided through at least one of Linear Variable Differential Transformer (LVDT) stick position 203, trim servomechanism force and position 204, weight on wheels (WOW) indication 205, aircraft state Embedded GPS/INU (EGI) 206, RADAR altimeter 207, and/or production aircraft ship data 219 measurement systems, as shown in FIG. 2. The MAA assembly 220 also comprises the Multi-Function Laser Detection and Ranging (LADAR) (MFL) range sensor 12, its controlling computer 218, and MFL operator display 217. This range sensor 12 is used by MAA guidance to detect and avoid obstacles and scan for safe landing areas. The MAA assembly 220 in this embodiment is connected by button signals 111 from button 601-604 on the pilot controls 101 and bezel buttons 606 on the ICE pilot display 214 along with the top-down map 215 all of which allows the pilot to interact with the autonomous capability to influence its behavior. To be clear, interacting with the autonomous capability through these mechanisms does not interfere with the trim servomechanisms 05 and SAS actuator 06 activity, as these inputs go through the autonomous capability from the MAA assembly 220, which in turn issues trim and servo commands, and thus, the autonomous capability still has complete control of the trim servomechanisms 05 and SAS actuators 06.

As seen in FIG. 2, the Integrated Cueing Environment (ICE) includes an ICE computer 208 that drives the ICE pilot display 214 that keeps the pilot apprised of the control activities of the autonomous capability. In this embodiment, the ICE computer 208 is the bus master and managed the MIL-STD-1553B bus 221 traffic amongst the HFCC 201, the MAA-A computer 209, RADAR altimeter 207, EGI 206, and the ICE computer 208. A MAA system operator station computer 216 allows an operator to monitor and interact with the autonomous guidance and flight control system as the pilot could. The other computers MAA-B 210, MAA-C 211, and MAA-D 213 run algorithms that provide guidance commands to the MAA-A computer 209. All the computers in the MAA assembly 220 communicate through Ethernet 222. In comparison with existing flight control systems for standard UH-60L helicopters, the autonomous guidance and flight control system on the partial authority aircraft 01, as seen in FIG. 1, of the present disclosure, demonstrates improved piloting and situational awareness capabilities by reducing the pilot's workload and/or task complexity. The pilot is able to supervise operation of the partial authority aircraft 01 similar to supervising a full authority aircraft operating the same autonomy. The system of the present disclosure allows the pilot to manually disengage the autonomous guidance and flight control system and revert to standard UH-60L flight controls if required.

Figure 3:
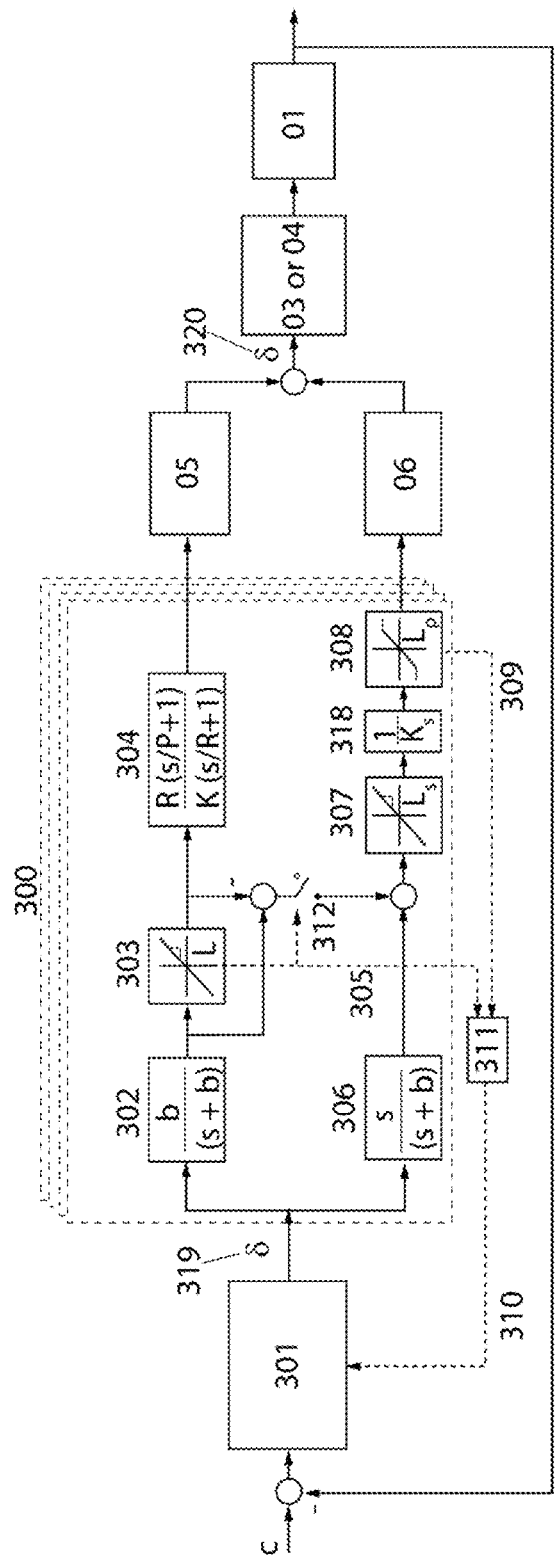
FIG. 3 is a schematic of a partial authority mixing unit that allocates commands from autonomous guidance and flight control laws to trim servomechanisms and Stability Augmentation System (SAS) servomechanisms.

To integrate the MAA assembly 220 within the aircraft assembly in FIG. 2 and achieve near full-authority performance, a Partial-Authority (PA) mixing unit 300 is inserted on each axis of control to command the corresponding trim servomechanisms 05 and corresponding SAS actuators 06. FIG. 3 shows a detail of the mixing between one axis of control of the autonomous guidance and flight control laws 301 and the corresponding trim servomechanisms 05 and SAS actuator 06. There is one PA mixing unit 300 for each axis of control, but FIG. 3 only shows one in detail. In the embodiment of FIG. 2, PA mixing unit commands leave the MAA-A computer 209 running the autonomous guidance and flight control laws 301, as seen in FIG. 3, and send them to the HFCC 201 via the MIL-STD-1553B bus 221. These trim servomechanisms 05 and SAS actuator 06 commands are forwarded via the STIB 202, which routes the commands to the trim servomechanisms 05 and SAS actuators in 06. On a full-authority Fly-By-Wire (FBW) aircraft, total commands ($\delta$) 319 resulting from the autonomous guidance and flight control laws 301 in FIG. 3 would go directly to corresponding main rotor primary actuators 03 or tail rotor primary actuators 04, respectively. However, in accordance with the present disclosure, the PA mixing unit 300 takes the corresponding total controls and distributes them through a low frequency block 302 and a high frequency block 306 such that the low frequency command is sent to the corresponding trim servomechanisms 05, while the high frequency commands are sent to the corresponding SAS actuator in 06, as seen in FIG. 3. It is assumed the trim servomechanisms 05 receiving the low frequency signal are such that they have full range capability, but low position rate capability. For example, the maximum rate for the servomechanisms in this embodiment is approximately 10%/sec of the full range authority. In comparison, the SAS actuators 06 can have high-rate capability, but limited position range. For example, in this embodiment, the SAS actuators 06 have a position range of +/−10% of the full axis of control range but have a 100%/sec rate capability of the range. As one with ordinary skill in the art would understand, the complementary nature of the capabilities of the trim servomechanisms 05 and SAS actuators 06 can be combined using this method to get a harmonious movement of both and to get a combined output 320 approximating the total command 319 to command the partial authority aircraft 01, as seen in FIG. 1, similar to that of a full-authority FBW aircraft. The PA mixing unit 300 also contains a lead filter 304 for reducing low frequency command delays prior to reaching the corresponding trim servomechanisms 05, which is adjusted through frequency (P) and gain (K) and is based on the identified behavior of the corresponding trim servomechanism 05. The lead filter 304 has a roll-off frequency R, which is set greater than the frequency P to attenuate any high frequency noise that could overdrive the corresponding trim servomechanisms 05. By adjusting frequency P to match the expected trim servo 05 dynamics, feedback delay is avoided, which could reduce the performance of the current embodiment. The gains (K) and the limits (L) are set based on the expected behavior of the corresponding trim servomechanisms 05 and the SAS actuator in 06. In alternative embodiments, a higher order lead filter could be used to better match the frequency response of the corresponding trim servo. The PA mixing unit 300 transfers excess required control to the SAS actuator 06 if the rate limiter 303 at the output of the low-frequency block 302 saturates. This transfer is indicated in FIG. 3 when the "On Rate Limit" condition signal 305 causes the closing of switch 312. The high frequency SAS commands are passed through a rate limiter 307, gain scale 318, and position limiter 308. When both the trim-rate "On Rate Limit" condition signal 305 and SAS position "On Pos Limit" condition signal 309 indicate saturation in the same direction as determined by the saturation logic 311, a stop integrator signal 310 is sent to the autonomous guidance and flight control laws 301 indicating it should stop its integrators in the associated control axes.

The critical setting in the PA mixing unit 300 of FIG. 3 is the break frequency, b, which controls distribution of the command to the corresponding trim servomechanisms 05 and SAS actuator 06. It is desirable to set the break frequency, b, to balance usage of the trim servo rate against SAS position. The break frequency is a proportional relationship between the trim servo-rate to the SAS position. For example, a value of b=2 rad/sec will generate approximately twice the trim servo rate compared to the SAS position. Using this knowledge, values are found with an acceptable balance as to minimize the probability of saturating either the trim servo rate or the SAS position. Generally, the break frequency b is set below the effective frequency of the trim servo 05 (to which the lead filter 304 frequency, P, is set), as the command content to the low frequency will be below the break frequency. The frequency content to the SAS actuator 06 will be above the break frequency b.

Figure 4:
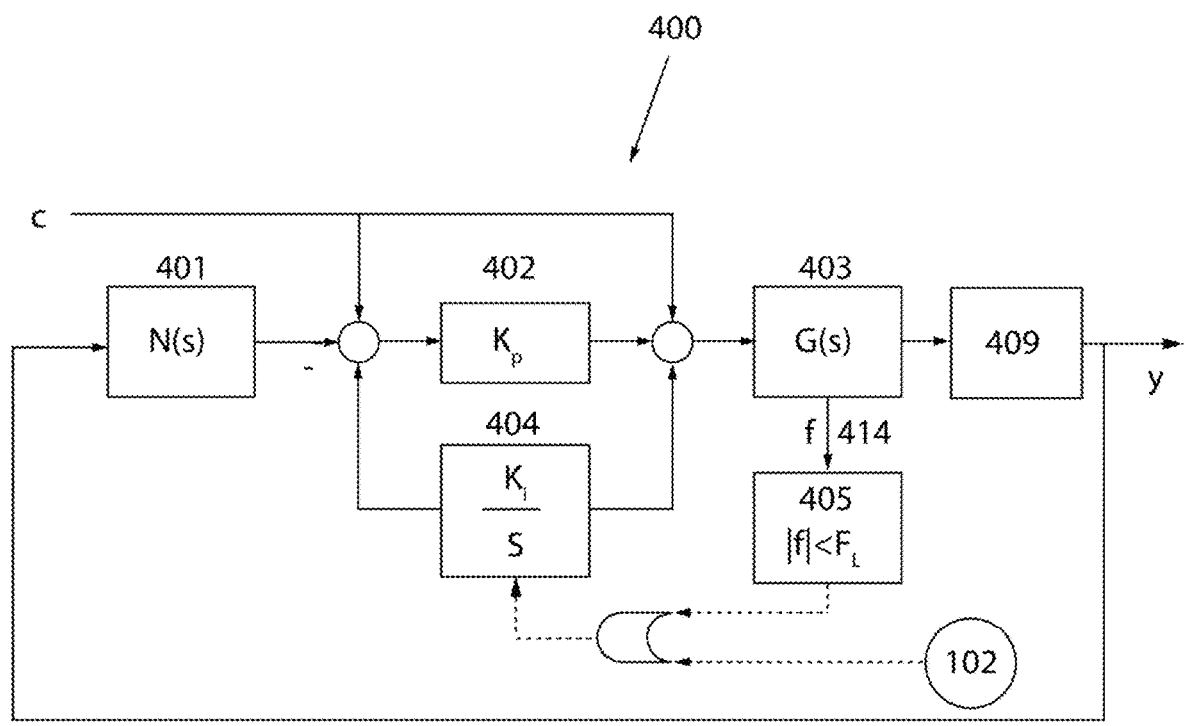
FIG. 4 is an illustration of a servomechanism feedback control loop to effectively control trim servomechanisms.
Figure 4:
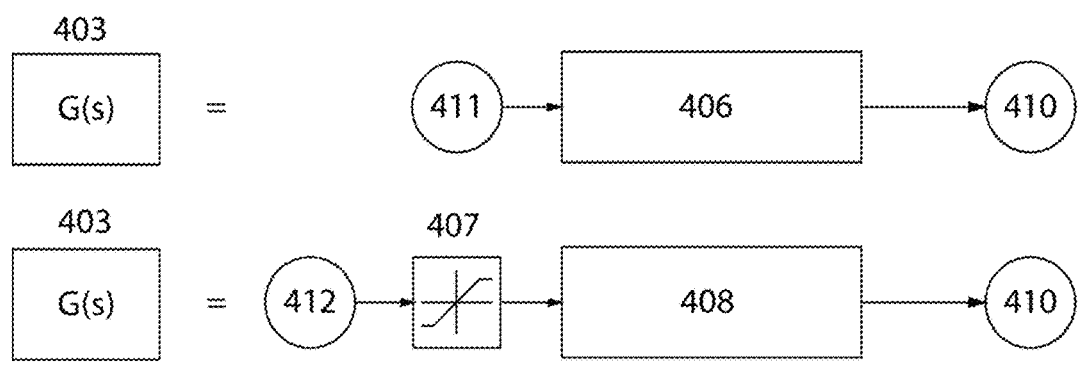

To make the embodiment of the system work properly, the trim servomechanisms 05 required additional control to eliminate non-linear effects and to make them more responsive to command inputs. Non-linear effects, such as quantization, coulomb friction, linkage backlash and cable flexibility, all contribute to sub-optimal servo control for control task. As shown in FIG. 4, the current embodiment requires the servomechanism feedback control loop 400 for each trim servomechanism 05, as shown in FIGS. 1 and 2, to overcome these issues. Since many partial authority systems will have similar hardware, this feature may be required for best performance. The feedback of the servo position sensor 409 passes through a second-order notch filter 401 and a proportional 402 and integral 404 (PI) feedback and can handle either an electric position-command servomechanism 406 or an hydraulic velocity commanded actuator 408. The sensor position measurements 410 are either corresponding LVDT 203 measurements or the corresponding trim servomechanism 05 measurements 204 from devices themselves that are sent to the HFCC 201, as shown in FIG. 2. In FIG. 4, the electric position-command servomechanism 406 receives position commands 411, while the velocity commanded hydraulic actuator 408 receives velocity commands 412. The integral 404 (PI) feedback is stopped if force (f) 414, generated by the pilot pushing against the servo motion, exceeds a threshold value $F_L$. In this embodiment, the pilot is instructed to not push against the trim servo force (f). However, this feature is still needed in case of inadvertent force being applied. The integral feedback 404 is stopped when the trim release signal 102 in the corresponding axis of control is activated from the pilot controls 101, as seen in FIG. 2, or the force limit 405 is achieved.

Figure 6:
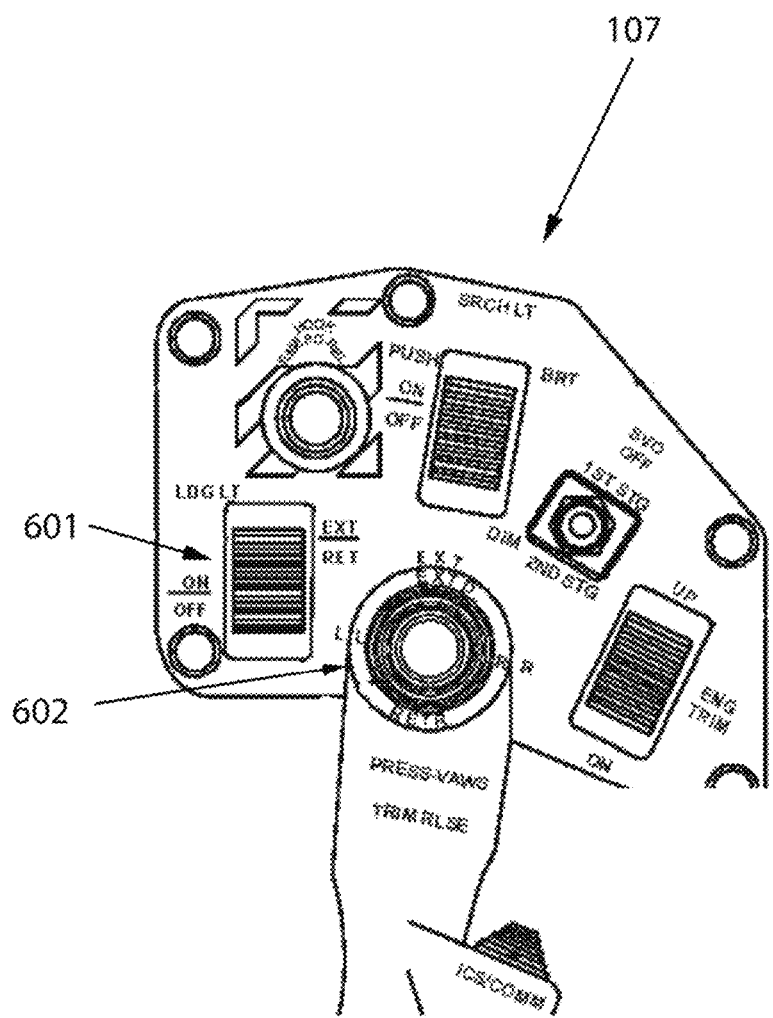
FIG. 6 is an example of a collective stick that enables pilot interaction with autonomous capability that avoids moving pilot controls against the autonomous capability commands to the trim servomechanisms.

As shown in FIG. 2, and in accordance with the current embodiment, the longitudinal servo 122 is hydraulic and a proportional velocity limiter 407, as seen in FIG. 4, is included to get a well-defined first-order frequency response from the servomechanism feedback control loop 400. As seen in FIG. 2, lateral 123, pedal 124, and collective 225 are electric position-command servomechanisms 406, as seen in FIG. 4, and they do not have a first-order response having considerably more magnitude output at higher frequencies. The pedal axis also has considerably more backlash than do the other axes, due to the length of the linkages and cables 105 from the MMU 104, as seen in FIG. 2, to the tail rotor primary actuators 04, as seen in FIGS. 1 and 2. This backlash causes significant delays in the servomechanism feedback control loop 400 for this axis, however acceptable performance is achieved. The collective stick 107, as shown in FIG. 6, has considerable Coulomb friction when raised or lowered, which makes it difficult to both rapidly command it to the desired position without considerable overshoot; however, the servomechanism feedback control loop helps mitigate these effects, and acceptable performance is achieved. Once the servomechanism feedback control loop 400 gains are set, the remaining parameters (P, K, L, R), in FIG. 3, can be set based on the servomechanism feedback control loop responses of the trim servomechanisms 05 with the servo loop feedback 400 active. As shown in FIG. 3, the lead filter 304 assumes a first-order response, much like what results from the hydraulic actuator 408, as shown in FIG. 4. The electric servomechanisms 406 do not have first-order response characteristics as they have much higher magnitude in the higher frequency range. Therefore, the P frequencies in the lead filter 304 for the lateral, pedal, and collective axes are set to first-order approximations of the response. These values are arrived at experimentally to recover as much trim servo lag from the lead filter 304 without exciting higher frequency modes, which generally reduces crossover frequency of the design. Alternate embodiments are possible to mitigate the issues that require the servomechanism feedback control loop 400, as seen in FIG. 4, in accordance with the current embodiment. Replacing the trim servomechanisms 05, as seen in FIG. 1, with servomechanisms with more favourable characteristics would avoid the aforementioned problems. The collective stick 107 of FIG. 7 has considerable Coulomb friction when raising and lowering it that could be eliminated by using an electro-mechanical device that reduces this friction when the system is engaged and restores it when the system is disengaged. The backlash in tail rotor linkages and cables 105 could be significantly reduced by moving the pedal SAS actuator 128 as seen in FIG. 2, closer to the tail rotor primary actuator 04 and tail rotor 10 as seen in FIG. 1. Other linkage non-linearities could be reduced by tightening the tolerances of the mechanical linkages 103, and the cables/linkages 105 themselves. These changes may not be cost effective, so the servomechanism feedback control loop 400 is an additional feature in this disclosure to realize this system.

Figure 5:
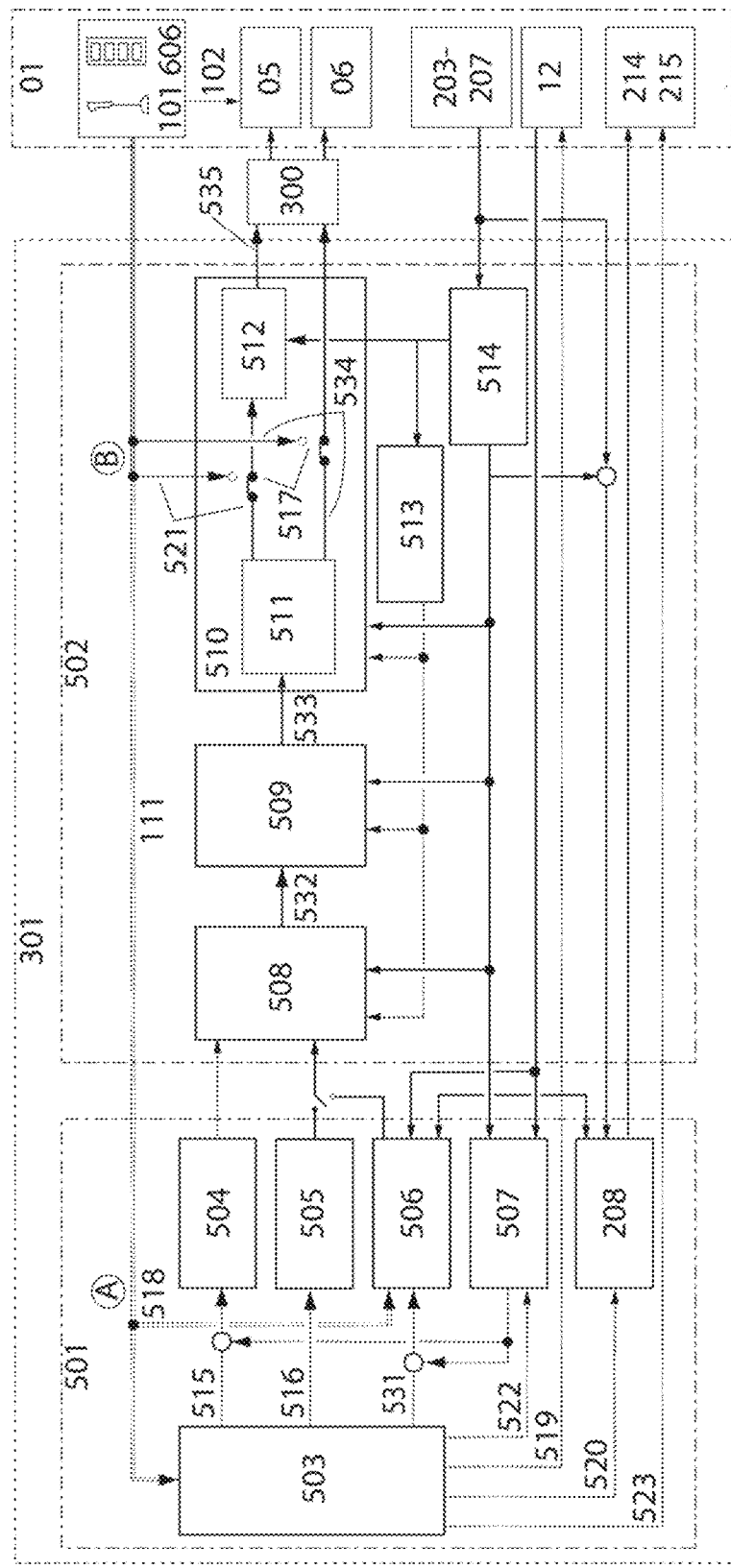
FIG. 5 is a schematic of the autonomous guidance and flight control laws with the partial authority mixing unit between the autonomous guidance and flight control system and the aircraft trim servomechanisms and SAS actuators.

The autonomous guidance and flight control laws 301, as shown in FIG. 5, were initially developed on a full authority aircraft and are adapted to the partial authority aircraft 01, as seen in FIG. 1, using the implementation of this disclosure. The autonomous guidance and flight control laws 301 are comprised of the Mission Software 501, which provides guidance, and the Autonomous Flight Control System Software (AFCSS) 502, which provides path following and attitude stabilization. The autonomous guidance and flight control laws 301 of the present disclosure are shown in a functional context with the PA mixing unit 300 and devices of the partial authority aircraft 01. As far as this disclosure is concerned, the exact nature of the autonomous capability is not important other than it must be fully autonomous in the sense the pilot(s) should neither push against the pilot controls 101 nor activate the trim release signal 102, while the autonomous capability is active, thereby denying the autonomous guidance and flight control laws 301 complete control of the trim servomechanisms 05. If each axis of control is independent of the others, alternate embodiments could have a system where only selected axes of control are autonomous, and the pilot actively flies the non-autonomous axes. An example of this would be if a trim servomechanism 05 failed and the pilot had to manually control this axis. The pilot(s) can interact with the autonomous capability directly by such means as button signals 111, as long as the trim servomechanisms 05 and SAS actuators 06 remain in the exclusive control of the autonomous guidance and flight control laws 301. In this embodiment, that means switches 517 are in the down position as shown. In alternate embodiments, if the pilot pushes against pilot controls' back driven force by the trim servomechanisms 05, or activates the trim release signal 102, then the system should disengage itself, at which time the pilot flies without the autonomous capability.

Figure 8:
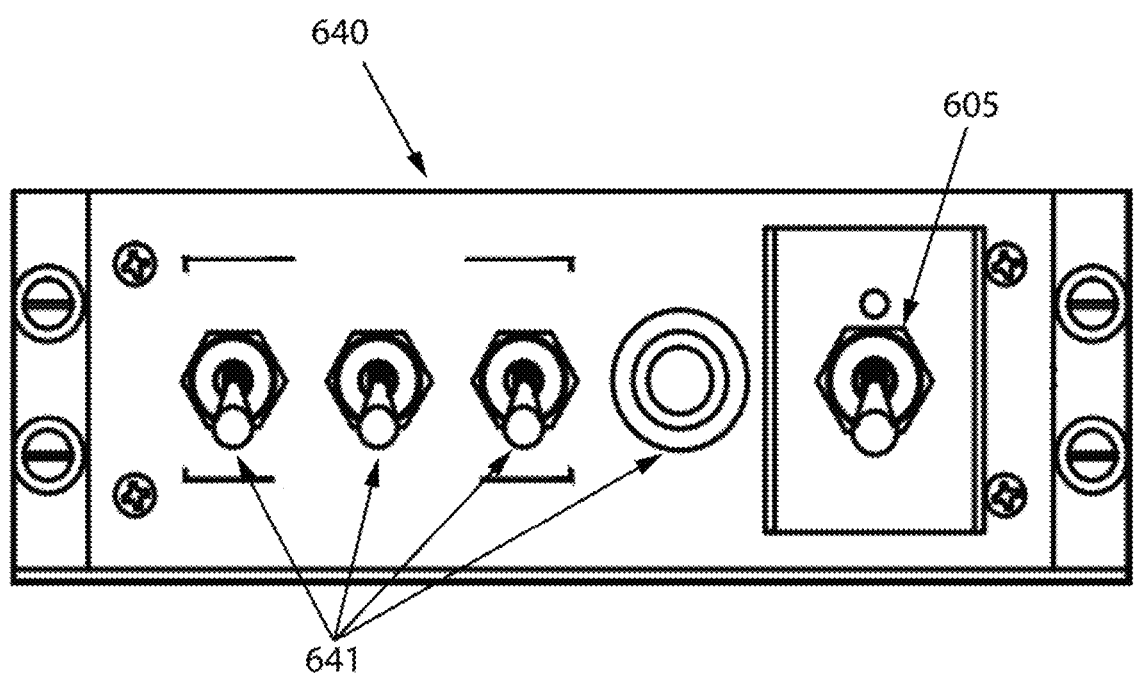
FIG. 8 is an illustration of the aircraft control panel between the pilots to control the trim servomechanisms and to control activation of the autonomous guidance and flight control system through a magnetic switch.
Figure 9:
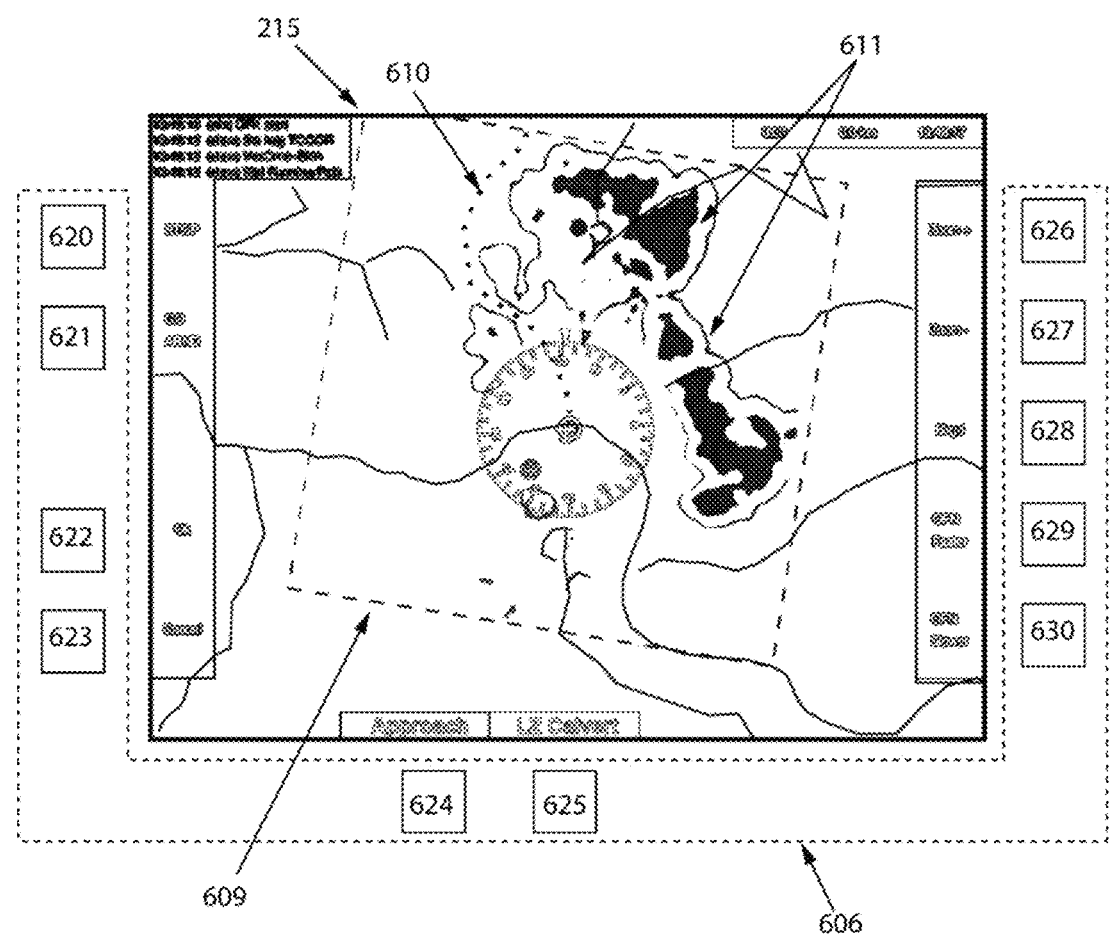
FIG. 9 is an illustration of a top-down map with bezel buttons that enables pilot interaction with autonomous capability and to monitor its behavior.
Figure 10:
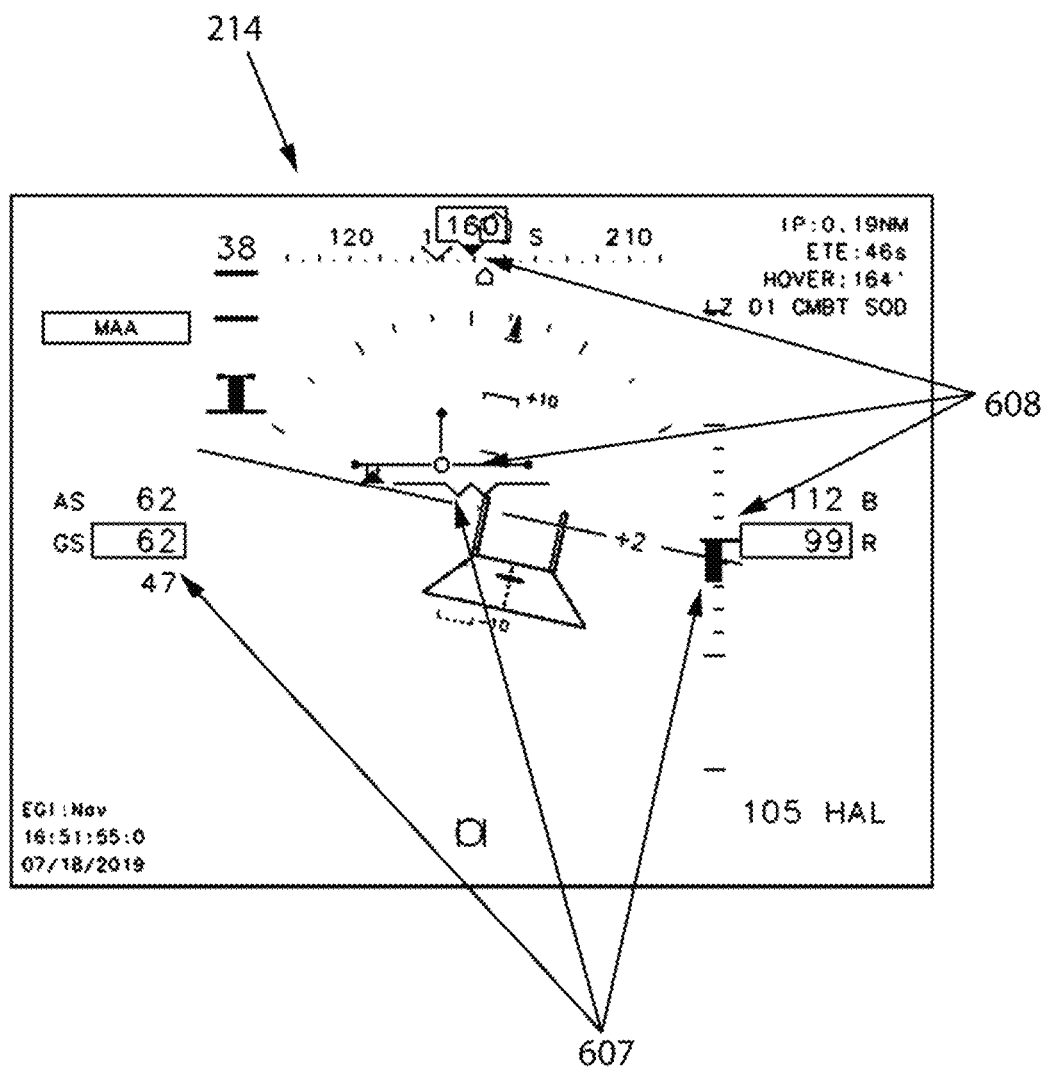
FIG. 10 is an example of a pilot display of the present disclosure that enables the pilot to monitor the behavior of the autonomous guidance and flight control system by showing it performance using conventional symbology used by pilots to manually fly aircraft.

For this embodiment, the autonomous guidance and flight control laws 301, as seen in FIG. 5, reside in the MAA-A computer 209, the MAA-B computer 210, the MAA-C computer 211 and the MAA-D computer 213, as seen in FIG. 2. In FIG. 5, the Mission Manager/Operator interface 503 allows the pilot or system operator to interact with the autonomous capability at an executive level by generating responses to button signals 111. FIGS. 6-10 show the devices used by the pilot to interact with the autonomy in this embodiment and include the collective stick grip 107, the cyclic stick grip 106, the system control panel 640, the top-down map 215, and ICE pilot display 214. The Mission Manager/Operator interface 503 also sends LADAR control signals 519 to the LADAR 12, Mission Data 520 to the ICE computer 208, SLAD control signals 522 to SLAD 507, and display data 523 to the pilot displays 214-215. An example of the pilot interacting with the autonomous capability is selecting a destination point using the bezel buttons 606 around the top-down map 215 in FIG. 9. These bezel buttons 606 have several functions to affect the autonomy and are comprised of the Stop OFN Motion 620, Go Around On Landing Approach 621, Accept Selection 622, Cancel Selection 623, OFN Mode List Selection 624, OFN Destination List Selection 625, Map Zoom In 626, Map Zoom Out 627, Map Type Toggle 628, OFN Speed Up 629, and OFN Slow Down 630. In addition, for pilot situational awareness, the ICE pilot display 214 is viewable to the pilot so they could monitor the guidance system's commands 608 compared to aircraft measurement symbology 607, as shown in FIG. 10. By monitoring the top-down map 215, as shown in FIG. 9, the pilot may glean the autonomous guidance and flight control laws' 301 intended path to a destination and landing point selection. The top-down map 215 has an image inset 609 (dashed square) sent from the Obstacle Field Navigation (OFN) algorithm 506, as shown in FIG. 5. As shown in FIG. 9, the inset shows the bounds of the OFN risk map. The Safe Path Indicator 610 (dotted path) shows the intended navigation path through the OFN high risk areas 611 shown on the top-down map 215 as brightly colored areas in contrast to subdued colors indicating low risk areas. The system is engaged for autonomous flight when the magnetic switch 605 is enabled on the system control panel 640 in FIG. 8 located between the pilots in the aircraft cockpit 07. The system control panel 640 has HFCC/STIB switches 641 to enable and disable the trim servomechanisms 05 through the HFCC 201 and STIB 202. As shown in FIGS. 7 and 8, the pilot can disengage the system and revert to the standard UH-60L flight controls by depressing the disengage button 604 on the cyclic grip 106, which would release the magnetic switch 605.

In FIG. 5, the path generation 504, the vector command 505, and the OFN 506 computes path information sent to the Waypoint Control 508. The latter, OFN 506, generates flight paths known to be clear of obstacles by using the Multi-Function Laser Detection and Ranging (LADAR) (MFL) range sensor 12 to continuously monitor the space ahead of the partial authority aircraft 01 and change course if obstacles are sensed. Pilot interaction with the OFN 506 occurs through the bezel buttons 606 around the top-down map 215 in FIG. 9, and by using switches on the collective stick 107, as seen in FIG. 6. As seen in FIGS. 5 and 6, the pilot could also steer the OFN 506 by using the additive offset button 602. By clicking this 5-way switch, biases are introduced into the OFN 506 that steer it left of right and adjust the altitude up or down; plunging the additive offset button 602 clears all the biases from the OFN 506. These additives signals 518 enter the Mission Software 501 at point A in FIG. 5. The path generation 504 generates an expanded and smoothed list of waypoints 515 that include position, velocity, acceleration, and time commands that are sent to the waypoint control 508. The vector command 505 is an alternate way to direct the waypoint control 508 using a velocity vector commands 516. These last two methods of control are non-reactive and assume the sent paths are obstacle free. The Safe Landing Area Determination (SLAD) 507 identifies flat, clear landing points using the Multi-Function Laser Detection and Ranging (LADAR) (MFL) range sensor 12. The pilot selects a landing point using the SLAD selection switch 601 on the collective stick 107 in FIG. 6 that are presented to them on the top-down map 215. The SLAD Selection switch 601 allows the pilot to highlight landing point options by toggling it fore or aft and make a selection by plunging it. These landing points are relayed as OFN destination waypoints 531 in FIG. 5 to the OFN 506, which guide the partial authority aircraft 01 to the selected landing point.

In FIG. 5, the AFCSS 502 runs on the MAA-A computer 209, as shown in FIG. 2 and includes a signal processing block 514 that conditions measurements from the sensors (203-207). A sequencer 513 executes pre-programmed sequences to carry out specific tasks, such as autonomous landing. In alternate embodiments, the sequencer 513 can perform automatic takeoffs if provided with proper hardware interfaces. The main control blocks in the AFCSS 502 are the waypoint control 508, tracking control 509, and an inner-loop control 510 shown in FIG. 5. Commands produced from the vector command 505, path generation 504, and/or an obstacle field navigation (OFN) 506 are accepted by the waypoint control 508. The waypoint control 508 transforms these input commands into a continuous stream of inertial coordinates representing the desired path position 532, which is sent to the tracking control 509. The tracking control 509 tracks the desired path position 532 generated from the waypoint control 508 and generates aircraft-referenced commands sent to the flight-path command 511 of the inner-loop control 510. The flight-path command 511 uses the aircraft-referenced commands 533 from the tracking control 509 as inputs and generates attitude-command inputs 521 sent to the attitude command 512. These attitude-command inputs 521 are roll attitude ($\phi_c$), pitch attitude ($\theta_c$), and yaw rate ($r_c$) in hover or sideslip ($\beta_c$) in forward flight. The collective command input ($\delta_c$) 534 is also generated by the flight-path command 511 and is sent directly into the PA mixing unit 300. The attitude command 512 is the basic attitude stabilization of the autonomous guidance and flight control laws 301 and converts attitude-command inputs 521 into attitude stick inputs 535 comprised of longitudinal ($\delta_e$), lateral ($\delta_a$), and pedal ($\delta_p$) stick inputs. These commands (534, 535) go into their respective PA mixing unit 300, as seen in FIG. 3, and, eventually, into the trim servomechanisms 05 and SAS actuators 06 that steer the partial authority aircraft 01, as seen in FIG. 2, in the longitudinal, lateral, heading, and vertical directions to follow the desired path originating from the Mission Software 501, as seen in FIG. 5. On a full-authority system, the autonomous guidance and flight control laws 301, as seen in FIG. 3, are implemented so the flight-path command 511 and the attitude command 512 in FIG. 5 could be decoupled to allow manual flying of the attitude command 512. This decoupling is accomplished by putting the switches 517 in the up position in FIG. 5 at B, so the attitude-command inputs 521 and the collective command input ($6e$) 534 originate from pilot controls 101 instead of from the flight-path command 511. As shown in FIGS. 1 and 2, however, the pilot flying the partial authority aircraft 01 in this situation would move the pilot control(s) 101, so they would interfere with the trim servomechanisms 05 because of the mechanical linkages 103 shown in FIG. 2. Because of this interference, the decoupling feature is not described in this embodiment. For this feature to be implemented on a partial authority helicopter as described in this disclosure, an alternate method to allocate the trim servomechanisms 05 and SAS actuators 06 would be needed when decoupled, which is out of the scope of this disclosure.

The foregoing description has been presented for the purposes of illustration and description. It is not intended to be exhaustive or to limit the disclosure to the precise form disclosed. Many modifications and variations are possible in view of this disclosure. Indeed, while certain features of this disclosure have been shown, described and/or claimed, it is not intended to be limited to the details above, since it will be understood that various omissions, modifications, substitutions and changes in the apparatuses, forms, method, steps and system illustrated and, in its operation, can be made by those skilled in the art without departing in any way from the spirit of the present disclosure.

Furthermore, the foregoing description, for purposes of explanation, used specific nomenclature to provide a thorough understanding of the disclosure. However, it will be apparent to one skilled in the art that the specific details are not required in order to practice the disclosure. Thus, the foregoing descriptions of specific embodiments of the present disclosure are presented for purposes of illustration and description. They are not intended to be exhaustive or to limit the disclosure to the precise forms disclosed; many modifications and variations are possible in view of the above teachings. The embodiments are chosen and described in order to best explain the principles of the disclosure and its practical applications, to thereby enable others skilled in the art to best utilize the disclosed system and method, and various embodiments with various modifications as are suited to the particular use contemplated.

What is claimed is:

1. An autonomous guidance and flight control system on a partial authority aircraft, the autonomous guidance and flight control system comprising:
   an aircraft assembly comprising pilot controls for each axes of control, at least one stability augmentation system servomechanism, at least one trim servomechanism, a hardware flight control computer, a stability augmentation system/trim interface box, a servomechanism feedback control loop, and a mechanical mixing unit, the aircraft assembly being collectively configured to operate control surfaces of the aircraft along at least one of the axes of control, wherein at least one of the stability augmentation system servomechanisms and the trim servomechanism is configured to receive commands from the hardware flight control computer and is configured to control an actuator connected to at least one of the pilot controls;
   a mission adaptive autonomy assembly comprising a plurality of computers, the plurality of computers, sensors, and displays collectively being configured to aid in autonomous flight maneuvers of the partial authority aircraft, at least one of the plurality of computers being configured to issue control command results; and
   a partial authority mixing unit, the partial-authority mixing unit being configured to receive the control command results from the mission adaptive autonomy assembly and filter said control command results into a low frequency component and a high frequency component.

2. The autonomous guidance and flight control system of claim 1, wherein the trim servomechanism is configured to receive a low frequency component of the control command results, and the stability augmentation system servomechanism is configured to receive a high frequency component of the control command results.

3. The autonomous guidance and flight control system of claim 2, wherein the stability augmentation system servomechanism has a high rate capability and a limited position range, the stability augmentation servomechanism being configured to direct an output to the mechanical mixing unit.

4. The autonomous guidance and flight control system of claim 2, wherein the trim servomechanism has a low rate and high position authority, the trim servomechanism being configured to direct an output to the mechanical mixing unit and back drive at least one pilot control.

5. The autonomous guidance and flight control system of claim 1, wherein the partial authority mixing unit further includes a lead filter with a roll off frequency, the lead filter being configured to best match the trim servomechanism's characteristics to mitigate phase delay from the low rate response of the trim servomechanism that could degrade performance of the autonomous guidance and flight control system.

6. The autonomous guidance and flight control system of claim 1, wherein the partial authority mixing unit senses trim rate limiting and reallocates the unachievable trim command due to the rate limit to the stability augmentation system servomechanism.

7. The autonomous guidance and flight control system of claim 1, wherein the partial authority mixing unit further senses that both the trim servomechanism rate limit and the stability augmentation system servomechanism position limit in the same direction and notifies the autonomous guidance and flight control laws so it can take appropriate action for actuation limiting.

8. The autonomous guidance and flight control system of claim 1, wherein the partial authority mixing unit monitors at least one of rate and position of at least one servomechanism.

9. The autonomous guidance and flight control system of claim 1, wherein the aircraft assembly further comprises a mechanical mixing unit, the mechanical mixing unit being configured to receive an output from the stability augmentation system servomechanisms and trim servomechanisms and to direct the output to one or more of the control surfaces, wherein the mechanical mixing unit is mechanically linked to one or more of the control surfaces of the aircraft through primary servomechanisms.

10. The autonomous guidance and flight control system of claim 9, wherein the mechanical mixing unit is configured to produce an output that is receivable by primary servomechanisms, the primary servomechanisms comprising at least one or more actuators being configured to actuate the control surfaces in combination to command each axis of control.

11. The autonomous guidance and flight control system of claim 1, wherein the at least one servomechanism further comprises a trim release mechanism, wherein the trim release mechanism prohibits the servomechanism from actuating control surfaces of the aircraft and shall not be activated in the axis of control when the partial authority mixing unit is operating.

12. The autonomous guidance and flight control system of claim 8, wherein the servo loop controller directs feedback control to at least one servomechanism through at least one computer.

13. The autonomous guidance and flight control system of claim 1, wherein the aircraft assembly further comprises a trim flight path system assembly and stability augmentation system assembly, the trim flight path system assembly and stability augmentation system assembly being configured to direct the commands to the stability augmentation system/trim interface box.

14. The autonomous guidance and flight control system of claim 1, wherein the stability augmentation system/trim interface box receives, from the hardware flight control computer, stability augmentation system servomechanisms commands and the trim servomechanisms commands generated by the partial authority mixing unit.

15. The autonomous guidance and flight control system of claim 1, wherein the partial authority mixing unit directs control to at least one servomechanism through at least one computer.

16. The autonomous guidance and flight control system of claim 1, wherein the stability augmentation system/trim interface box configured to provide commands from those described in claim 13 is the system disengaged with the MAA assembly not in control.

17. The autonomous guidance and flight control system of claim 1, wherein the stability augmentation system/trim interface box configured to provide commands from those described in claim 14 is the system engaged with the MAA assembly in autonomous control.

18. The autonomous guidance and flight control system of claim 1, wherein the hardware flight control computer directs commands to at least one of the trim servomechanisms and the stability augmentation system servomechanism.

19. The autonomous guidance and flight control system of claim 1, further comprising at least one servo-loop feedback controller, the servo-loop feedback controller being configured to use feedback of at least one servomechanism position measurement to mitigate undesirable command responses of the servomechanism.

* * * * *